(12) United States Patent
Wolfe (10) Patent No.: US 9,433,337 B2
(45) Date of Patent: Sep. 6, 2016

(54) METHOD AND APPARATUS FOR DETERMINING THAT A WATERCYCLE HAS COMPLETED

(71) Applicant: Amy Wolfe, Dacula, GA (US)

(72) Inventor: Amy Wolfe, Dacula, GA (US)

( * ) Notice: Subject to any disclaimer, the term of this patent is extended or adjusted under 35 U.S.C. 154(b) by 319 days.

(21) Appl. No.: 14/264,042

(22) Filed: Apr. 28, 2014

(65) Prior Publication Data

US 2015/0305591 A1   Oct. 29, 2015

(51) Int. Cl.
  *A47L 15/42*   (2006.01)
(52) U.S. Cl.
  CPC ........ *A47L 15/4244* (2013.01); *A47L 15/4295* (2013.01)
(58) Field of Classification Search
  CPC ............. A47L 15/4244; A47L 15/429; A47L 15/42953
  USPC .................................. 134/113; 116/200, 228
  See application file for complete search history.

(56) References Cited

U.S. PATENT DOCUMENTS

| | | |
|---|---|---|
| 5,477,872 A | 12/1995 | Berg |
| 5,839,458 A | 11/1998 | Delearson |
| 6,196,239 B1 | 3/2001 | Eskey |
| 6,427,708 B1 * | 8/2002 | Jermyn ............... A47L 15/4293 116/216 |
| 7,516,746 B1 | 4/2009 | Davis |
| 8,555,803 B2 | 10/2013 | McCormick |
| 8,662,006 B1 | 3/2014 | Patzer |
| 2012/0060866 A1 | 3/2012 | McCormick |
| 2014/0041573 A1 | 2/2014 | Patzer |

\* cited by examiner

*Primary Examiner* — Saeed T Chaudhry
(74) *Attorney, Agent, or Firm* — John L. Doughty (57) ABSTRACT

A device, comprising a float, basin, and basin cover, is removably attached to interior rungs of a dishwasher via clip-hooks, and stabilized with a tongue arm, design features of the clip-hooks, and the cooperating portions of the basin or cover. The float rises to a completed water cycle 'clean' position as basin fills with water. The basin may block view of the float when in a 'dirty' position. The float provides visual indication of a completed water cycle, and therefore 'clean' dishes, after rising as a result of water introduced into the basin via holes in the cover. Water that was introduced into the device automatically leaves the chamber via one, or more, discharge holes/openings in the basin, while the float remains in the 'clean' position because of one or more retainers; e.g., magnetic force from one or more magnets. Retainers can generated and communicate position status to a smartphone.

20 Claims, 5 Drawing Sheets

METHOD AND APPARATUS FOR DETERMINING THAT A WATERCYCLE HAS COMPLETED

FIELD

Aspects relate to accessories and optional built-in equipment for a dishwasher

SUMMARY

An apparatus provides visual indication that a dishwasher cycle has completed. Water introduced into the apparatus moves an indicator component from a dirty position to a clean position. A retainer retains the indicator component in the clean position after water has been evacuated from the apparatus. The indicator component may be a float that rises as a basin component that the indicator fits into fills with water present in the dishwasher wash compartment during a cycle. A small drain hole, preferable a pin-sized hole, may facilitate water that caused the indicator component to change position (rise in a preferred embodiment) to leave the basin, or similar component that collects water during a dishwashing cycle. Preferably, the drain hole is sized to drain water from the basin at a rate that is slower that the rate at which water is introduced in the basin. The introduction rate may be based on an expected presence of water at a particular location in the dishwasher, or other water equipment being monitored with the device. Retainer components, preferably one or more magnets and complementary magnetic material (which could include a magnetic material or an actual magnet), retain the visual indicator (preferably a float) in a position that the water in the basin caused it to move to.

DETAILED DESCRIPTION OF THE DRAWINGS

The following detailed description of example implementations refers to the accompanying drawings. The same reference numbers in different drawings may identify the same or similar elements.

Aspects relate to several areas, including the quick, easy, and improved visibility of the true status of clean or dirty, stabilization of the device in the dishwasher, assurance of the device fitting most, if not all, styles of dishwashers, ease of use for resetting the device status, solving reliability deficiencies that past indicators have shown, and design improvements that do not hold dirty water in the device, thereby improving any potential health and safety issues present.

An aspect includes an apparatus that provides visual indication of a clean/dirty status of dishes or the interior of a dishwasher. The apparatus automatically changes from a dirty to a clean position by the introduction of water into a basin, or vessel, of the apparatus. After a wash cycle has run, a preferred embodiment does not require water to remain in the apparatus (also referred to as a device) as a visual indication that water has splashed about inside the dishwasher. Water evaporates and thus could cause a false indication that a wash cycle has not run yet. In addition, heat may not function as a reliable indicator activation method in many dishwasher models that do not use much heat for washing and drying, or in dishwasher cycles that do not use much heat, such as 'rinse,' 'china,' or 'energy saving' cycles. Therefore, a preferred embodiment does not rely on heat inside a dishwasher during washing or drying to cause a component of the apparatus to change from a dirty to a clean position.

The device is placed within the dishwasher and is removably attached to an interior rack rung of a dishwasher via clip-hooks, and stabilized with a tongue arm and also by the special design features of the clip-hooks. When the user runs a dishwasher cycle, water is introduced into housing chamber, or basin, of the device, and a movable float contained within the housing is raised, thereby exposing a different view of the device to indicate clean. The water that was introduced into the device automatically leaves the chamber/basin via a number of voids in the housing, while the float remains in the clean indication position through the use of one or more magnets held inside or on the housing and/or float. The user can quickly see a visual indication of clean or dirty, and does not need to remove the device to reset, but simply presses the float back down into the basin. A button that projects from the top of the float may be referred to as a reset button. When a user presses the float down, the user's applied force overcomes the magnetic field force that retains the float in a risen position, which allows the float to drop back down to the dirty indication position. It will be appreciated that the float can have a flat top instead of defining a button, and that a user can push the float down by pushing down on the flat top (or other contour that the top of the float may define).

Figure 1:
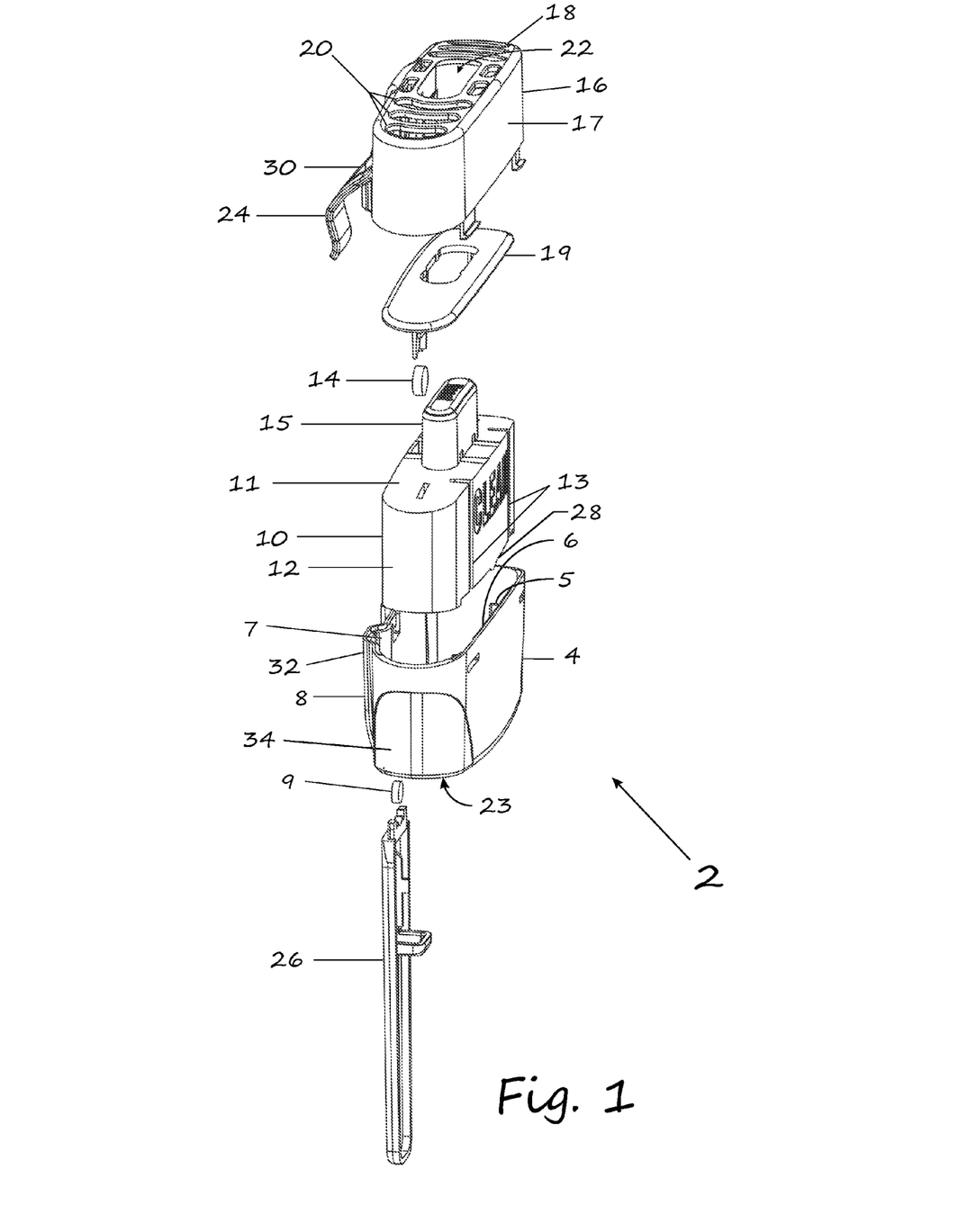
FIG. 1 illustrates an exploded view of a water cycle indicator device.

Turning now to FIG. 1, the figure illustrates an exploded view of a water cycle completion indicator device 2. Indicator device 2 comprises basin 4 that may have guide rails 5 formed on the inside of the basin on guide wall 6. Basin 4, preferably made of a corrosion-proof rigid material, such as plastic, may also include one or more lifting-water channels 7 that may be formed into water channel wall 8. Basin 4 also includes a retainer 9, such as a magnet, a magnetic metal, an interference-fit button, a pawl, a catch, or other similar means. It will be appreciated that a magnet is the preferred embodiment of retainer(s) 9. Other retainer means could include a spring, release, catch, switch, or electronically triggered stop.

Device 2 also comprises float 10. Float 10 is sized and configured to movably fit inside basin 4. Float 10 is preferable formed from a rigid material that, as with the plastic of basin 4, can withstand temperatures and chemicals typically used in a dishwasher. Float 10 is configured to be buoyant with respect to basin 4 as the basin fills with water, or other liquid. Float 10 may be solid plastic, or may form an enclosure that totally encloses a hollow core. However, float 10 preferably defines a top 11 and skirt 12 that surround a hollow core, but the float does not define a bottom. Thus, preferably, even though float 10 may be formed from a material that is inherently buoyant relative to water, or other liquid, air trapped under top 11 and surrounded by skirt 12 pushes float 10 upward as basin 4 fills with water, or other liquid. Float 10 may include notch 28, (may be referred to as an indented portion of the float skirt 12), between the bottom rim of skirt 12 and inside surface of basin bottom 23, that facilitates water movement between the float skirt and the basin inside surface to reduce the likelihood of suction between them, which might resist them from easily separating, thereby making it harder for the float to rise reliably during a water cycle. The exterior of float 10 is preferably formed to have substantially the same shape as the interior of basin 4 when viewed in plan view. In an aspect, to aid, or assist, or maintain the correct vertical path during the lifting of float 10 as basin 4 fills, or to aid, assist, or maintain the correct vertical path, during lifting of the float, one or more float guide channels 13 slidingly engage with guide rails 5 of basin 4. When basin 4 has filled with a predetermined amount of water, and float 10 has risen from a low (i.e., dirty) position within the basin when the basin is empty to a predetermined desired risen height (i.e., clean position) based on the water level in the basin, complementary retainer 14, which may be embedded in, or attached to the inside of, skirt 12, will retain the float at the predetermined height when the attraction of its magnetic field to retainer 9 of basin 4 is strong enough to hold it even if water has drained out of, or otherwise left, the basin. FIG. 1 shows retainer 9 substantially at the top of, or near the top of, basin 4, and retainer 14 substantially at the bottom of, or near the bottom of skirt 12. Thus, the positions of retainers 9 and 14 determine the predetermined desired risen height at which the retainers retain float 10 within basin 4. Retainers 9 and 14 may be exposed or encapsulated within the housing of the basin, float, or top, to aid in protecting the retainers from the environment of the dishwasher. It can be foreseen that another aspect has retainer 9 attached to or embedded in other portions of the housing than the basin, such as the top cover 16, and this placement of retainer 9 will still affect the same result of holding the float at the predetermined height when it comes in proximity of the complimentary retainer 14 of the float. It will be appreciated that the figure does not show a drain, but the bottom of basin 4 may define an orifice, or opening, that permits water, or other liquid, to drain from it at a rate substantially slower, or less than, the fill rate, or introduction rate, of water while a dishwasher, or other water/liquid/fluid cycle to be monitored, dispenses water around, about, or at indicator device 2. Another figure shows the drain hole. The size of the drain hole may be different for different uses where water amounts during a cycle may differ, or for uses where a liquid/fluid other than water may be monitored with device 2 and wherein the other fluid/liquid has a different viscosity that water. Evaporation may cause water to leave basin 4, but retainers 9 and 14 will retain float 10 at the predetermined desired risen height relative to basin 4 even if basin empties after filling has caused float 10 to rise. In addition to guide channels, float 10 preferably defines a float button 15 that projects above top 11 by a predetermined projection amount. Float button 15 may be referred to as a 'reset' button, because a user should push it to reset the device to the 'dirty' position after the water cycle to be monitored has occurred. Basin bottom 23 preferably defines a curved, tapered, or concave, shape that directs water to drain hole (also referred to herein as drain opening) 27. In other words, like a drain in a floor in a building, the floor of basin bottom 23 preferably slopes toward to drain hole 27 to facilitate emptying of basin 4. Basin wall 8 may also define grip areas 34 on opposing sides or opposing areas of the outside of the basin that define recessed or protruding surface areas substantially near the basin bottom that facilitate a user holding device 2 firmly during placement, removal, and/or cleaning of the device. These areas 34 may be indented, protruding, textured or smooth, and may be of any shape or size as to affect the desired result of a user having a grip location.

Cover 16 preferably has a similar shape as basin 4, but as viewed in the figure, may not have a wall 17 as high as the height of a wall of the basin. In essence, although preferably not as high as basin 4 as viewed in the figure, cover 16 may be viewed as an inverted version of basin—what would otherwise be the bottom of basin 4 is top 18 of cover 16. Cover top 18 may define water regulation holes 20 that permit water to pass through top 18 into the inside of cover 16 (this process may be referred to as introduction of water into basin 4). Although not shown in the figure, cover 16 preferably defines lifting-water directors that, when the cover is attached to basin 4, mate with, and direct water that entered cover 16 through holes 20 toward, water channels 7 of the basin. Also not shown in the figure, cover 16 and basin 4 preferably comprise attachment means that permit removable attachment of the cover to the basin. Such attachment means may include hooks, catches, lips, snaps, interference fit tabs, one, or more hinges, VELCRO®, interference fit between the cover and the basin, and other similar means. Preferably, any means for attaching the cover to the basin should not substantially interfere with float 10 as it rises inside basin 4 as the basin files with water (although such an interference could perform the function of retaining the float at the desired risen height). Although in some embodiments a slight amount of interference between float 10 and either basin 4 or cover 16 may be desired to regulate the speed that float 10 rise, the size and amount of water holes 18 may provide a desired regulation of water introduced into basin 4. Thus, float 10 may not rise to the predetermined desired height until a dishwasher has completed all wash and rinse cycles. As a separate embodiment, different covers 16 with different sizes or numbers of holes 20 may be used for different dishwashing cycle lengths, for different locations within a dishwasher, or for different dishwashers (different dishwashers may have different internal water movement that could cause differing rates of introduction of water into basin 4 based on the different water movements) so that float 10 does not reach its desired predetermined desired risen height (i.e., clean position) until an entire cycle (which may include multiple wash or rinse cycles) has completed. As a benefit, cover 16 protects float 10 from articles inside the dishwasher that may lean against the device, thereby, ensuring reliable operation of the float in rising to the predetermined 'clean' position height.

Cover 16 also defines a float guide 22 (also referred to as a float guide opening), which the figure shows as a hole formed in top 18. The size and shape of hole 22 preferably is substantially the same as, although preferably slightly larger than, the size and shape of button 15 of float 10. Thus, even without one or more guide rails 5 and guide channels 13, button 15 can pass through top 18 as float 10 rises as basin 4 fills with water introduced to it substantially via channels 7. It will be appreciated that hole 22 and button 15 are not required for the device to operate. Instead of having button 15 protrude through hole 22, float 10 could be reset (i.e., moved from the risen 'clean' position to the lower 'dirty' position) by pushing downward with a user's finger through the hole. Other 'reset' means are contemplated, including a lever, an arm, or the like, including electronic motivation components. Such electronic reset means could include receiving a wireless signal that triggers, or instigates, a mechanism that overcomes magnetic force of retainer magnets, or that may cause a retaining mechanism, including those discussed above, to release their retaining of basin 4 in the clean position.

The total height of float 10 (the distance from the bottom of skirt 12 to a distal end of button 15 as shown in the figure) is preferably substantially equal to, or less than, the total height from floor 23 of basin 4 to top 18 when cap 16 is attached to the basin. The height of float button 15 (i.e., the amount the distal end of button 15 extends above top 11 of float 10) may be enough so that when the float has risen such that retainers 9 and 14 engage, because the float has reached its predetermined desired risen height (i.e., 'clean' height), the float button projects through float guide 22 to a height substantial enough to visually confirm that the float is at its predetermined desired risen height. In an aspect, float top 11 may be flat and not project through cover 16 when in the 'clean' position. Even if float top 11 defines a substantially flat surface, a user can push down float 10 through float guide 22, which is preferable a hole with a size large enough to permit at least a portion of the user's finger to pass through enough that the float retainer is not retained by the complementary retainer of basin 4 or cover 16. In other aspects, float guide hole 22 may be sized small enough to restrict a user's finger passing trough, but large enough to permit a pin, a stylus, a straw, a pen, a pencil, or other similarly sized object to pass through and push float 10 from its desired risen height, (i.e., a 'clean' height) which places the top of the float at, or very near the top of cover 16, to a position that is substantially below the top of the cover (i.e., the 'dirty' position).

In an aspect, float button 15 may be formed of material of, or covered with a material having, a different color than the material of the top of the float top 11(i.e. at the distal end), which may be the same color as basin 4 and cover 16. Preferably, cover 16 is made from a transparent, or translucent, material, to facilitate visual confirmation that float 10 has risen to the 'clean' position. In an aspect, basin 4 is formed from opaque material. Thus, if basin 4 is opaque and cover 16 is transparent, or translucent, viewing the float through the cover would provide visual indication that the float is in the 'clean' position. In an aspect, the visual differentiation of color of float top 11 from float skirt 12 can be accomplished by adding a separate panel 19 attached to the top of float 10 over float top 11, thereby allowing the addition of a contrasting color to be simplified in the manufacturing process as an alternative to paint or pigments on or in the plastic of float 10. Accordingly, button 15 may project above top 18 when basin 4 has filled, but a contrasting color, or colors, would provide a quick and easy visual indication that the button was projecting above the top, or a clear cover 16 would facilitate confirmation of the clean position, even if float 10 does not define a button that projects above float top 11. In addition, different bands or patterns on, or around, button 15 and/or float skirt 12 could correspond to different sets of complementary retainers that engage at corresponding different predetermined desired risen heights of float 10.

Although device 2 may find many uses for measuring water, or other liquids or fluids, during a particular cycle, such as watering a lawn or flowers, measuring water use in a car wash facility, rain fall, irrigation, sprinklers, water flow in a stream, creek, river, or other similar flow of liquid, a preferred embodiment is intended for use in a dishwasher, in either commercial or residential setting. If utilized in other settings, it can be appreciated that the device 2 may be made in part or in whole of other materials than the preferred plastics talked about herein, such as metals, glass, etc. As shown in the figure, cover 16 defines clip-hooks 24(which may be referred to as pressure tabs) that are configured to exert a bias against a dish washer rung wire while sliding over the wire, and then for retaining device 2 to a rung in a dishwasher rack, basket, or other support inside the dishwasher. Each clip-hook 24 may define a protruding reinforcing rib 30 running from the top surface of the hook up and onto cover 16 to strengthen the connection of clip-hook 24 to the cover wall 17, as well as providing and adding flexible biasing resistance in the clip-hook while placing over a dishwasher rung; because the biasing resistance resists sliding over a rung, the biasing resistance also helps secure device 2 to a dishwasher rung.

The outward protrusion portions 32 of channels 7, which lie behind clip-hooks 24, further facilitate securely fitting device 2 onto a dishwasher rack. The outward protrusion 32 of channels 7 supply a contact point on which the basin 4 can rest in an optimal position, as well as allow indicator device 2 to be placed on either side of the horizontal rung (to accommodate dishwashers that have vertical rungs on either the inside or the outside of the horizontal), as well as allow the one or more vertical rungs to lie in locations wider than, or outside of, or to fit between the one or more regions between one or more clip-hooks 24 and one or more tongues 26. The outward protrusions 32 of channels 7 in concert with the clip-hooks 24 create an encapsulating shape around the rung, further facilitating a secure fit in on multiple styles and sizes of dishwasher rack rungs. This encapsulation by the combination of the clip-hooks 24 and outward protrusions 32 of channels 7 around a dishwasher rack rung ensures that the device will not be blown from its location by the forces of water projected toward the device in any direction, including upward projection, by the cycle of the dishwasher.

Protrusions 32 may start on basin 4 instead of cover 16. Clip-hooks may originate from basin 4 instead of cover 16.

In addition, stabilizer tongue 26 prevents rotation of device 2 about a wire that hooks 24 may attach device 2 onto. Thus, with the cooperation of hooks 24 and stabilizer 26, basin bottom 23 is substantially level relative to gravity (i.e., bottom 233 is substantially perpendicular to gravity) and thus as basin 4 fills, float 10 does not bind as it rises substantially parallel to gravity within the basin. Stabilizer tongue 26 preferably has a center with a void, which may be thought of as an elongated loop, which may facilitate attaching device 2 to retail packaging, for example with strapping that attaches device 2 to a retail display card, as well as reduces the risk of displacement of device 2 on the dishwasher rung due to water pressure hitting the device by minimizing the surface area of tongue 26 the water may hit.

In an aspect basin bottom 23 may define recessed areas substantially near the bottom that that are indented with respect to the wall, or walls, or the basin. In an aspect, the basin may comprise a substantially continuous wall, or may comprise two or more walls, wherein the continuous wall, or the two or more walls, connect to the basin's bottom 23 at an intersection with the basin bottom. The continuous wall may follow a substantially circular, oval, or other shape that defines an at least partially closed vessel when connected to the basin bottom 23. In an aspect, the intersection of the one continuous wall, or two or more walls, may define one, or more, drain holes (item 27 in FIG. 6). Preferably, the basin bottom 23 defines a drain, or discharge, hole(s)/opening(s) 27 that facilitate(s) water draining from basin 4.

It will be appreciated that in some aspects, device 2 may be incorporated by a dishwasher manufacturer (or manufacturer of other types of water use equipment that device 2 is used to monitor). In such embodiments, device 2 may comprise different components than disclosed herein. For example, rather than separate basin and cover components, a float could be assembled inside a housing that is molded, or formed, into a wall or door of a dishwasher. Some, or all, of the features disclosed herein could be incorporated into the housing. For example, if the housing were incorporated as part of the dishwasher's wall or door, features such as the stabilizer tongue and clip-hooks may not be necessary. Also, in such an installation, one or more of the retaining means could be electronically released via circuitry built into the dishwasher. If the retainers are magnets, one or more of them could be electric magnets that are formed from coils or electrical wire or other electrical components that can generate a magnetic field.

In addition, in either the built-it or accessory aspect, either the magnets could trigger a circuit, or other embedded contacts could touch and complete an electrical circuit that sends a wireless message that the float is in the 'clean' position. This could possibly be done with an RFID chip embedded in the cover (or housing in the built-in embodiment) and when the float rises to the clean position, the magnet (or another magnet) induces a current in a wire that triggers the RFID chip to broadcast a wireless message that the float is in the clean position. The RFID device could transmit a signal to a local computer, or other conceived wireless system or satellite, which could make the 'clean', or 'dirty', status information available to a remote smartphone, other wireless device, a computer, or a user application running on one or more of the devices, or the RFID device could transmit the signal directly to a smartphone or wireless device. In addition to an RFID device, contacts or sensors that sense the position of the float could generate a position signal (perhaps by completing a circuit that is part of the dishwasher, or from a current induced into a coil or similar component by an electromagnetic field of a magnet on the float) and the dishwasher itself could provide an indication on the dishwasher that the cycle had completed to the user application. Apparatus/device 2 may also include, or be in wired or wireless communication with, an internet-of-things circuit, or module, that permits a user application running on a user device, such as a computer, tablet, smartphone, or similar, to remotely obtain the 'clean' or 'dirty' status of the apparatus, and perhaps remotely reset float 10 to the dirty position by using the user application to send a message to the apparatus to cause the float to drop, perhaps by releasing a catch-retainer, energizing a solenoid that overcomes magnetic field of the retainers 9 and 14, or by removing energy from one of magnetic retainers 9 or 14 if they are electromagnets (i.e., one or more coils of wire coupled to a controllable energy source). Also, the dishwasher could generate a message in response to the contacts or sensor generating the position signal and transmit it to a smartphone or other computer devices.

Other uses of device 2 could include determining if a water height was present at some point such as in a fish tanks, a cooking vessel, research liquid container, water treatment facilities, swimming pool, greenhouse water storage, sprinkled areas, a rain barrel, etc.

Figures 2, 3:
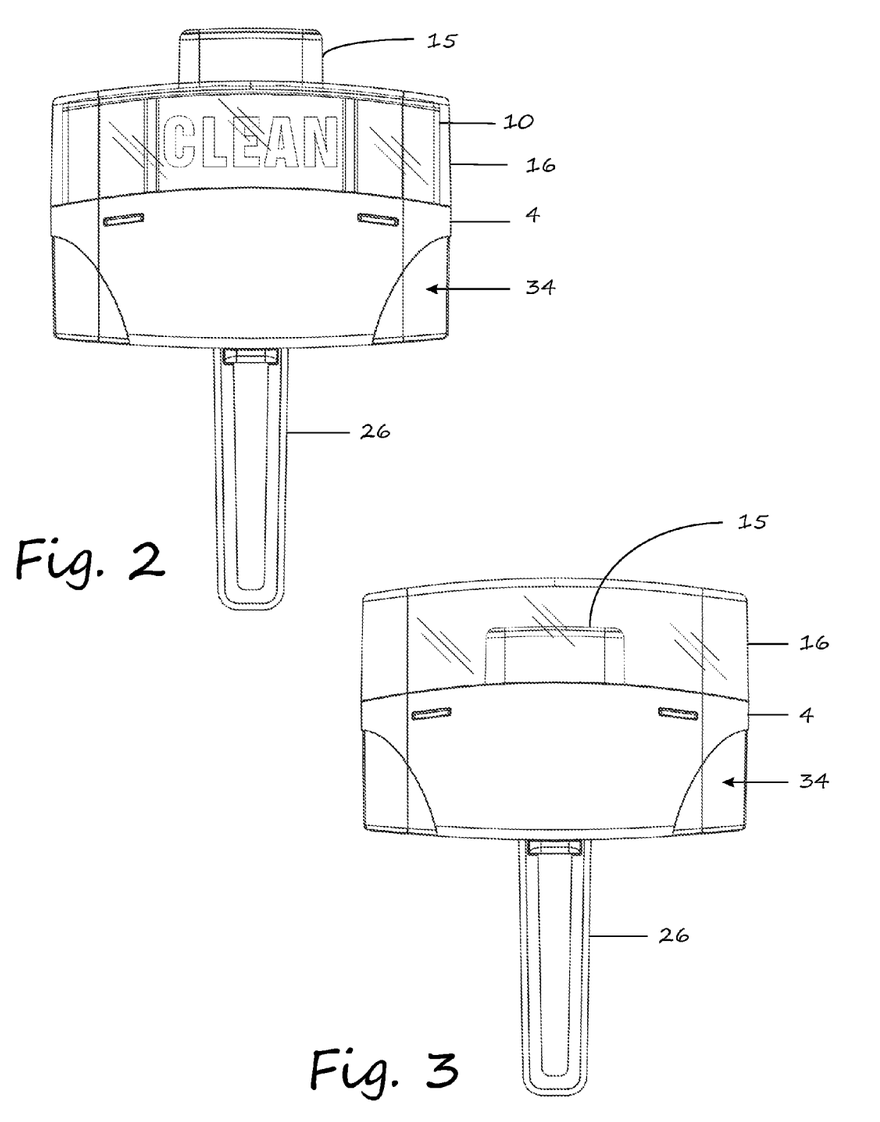
FIG. 2 illustrates a front view of a water cycle indicator device showing it in a 'clean' position.
FIG. 3 illustrates a front view of a water cycle indicator device showing it in a 'dirty' position.

Turning now to FIG. 2, device 2 is shown with float 10 in the highest position inside clear cover 16. Button 15 protrudes through cover 16 when the device is in this 'clean' position. In this view basin 4 is opaque, and cover 16 is clear. Grip areas 34 are shown on either side of the basin 4 with sufficient area for the user to have a firm hold on the unit for placement, removal, and gripping during cleaning. Tongue 26 stabilizes the device for placement inside a wide number of and models of dishwasher brands and designs.

Turning now to FIG. 3, device 2 is shown in the starting position of 'dirty', and the float is not visible through clear cover 16, except for the float button 15, which remains above the horizontal plane of the top edge of basin 4. Grip areas 34 are visible indentations on either side of basin 4, and tongue 26 is attached to basin 4.

Figure 4:
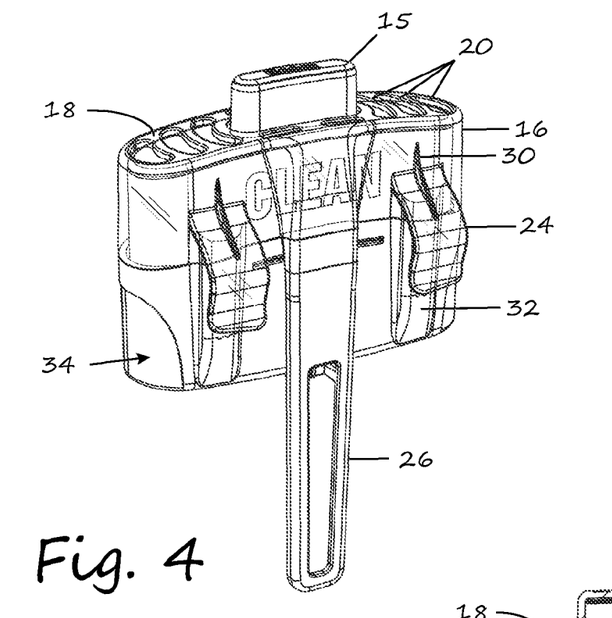
FIG. 4 illustrates a back view of a water cycle indicator device showing hooks, tongue, and channels that retain the device to a support that places the device in a desired position.

Turning now to FIG. 4, the figure shows device 2 in a perspective view on the side containing the clip-hook and tongue connections. In this figure float button 15 is at the highest 'clean' position, and protruding through clear cover 16. Holes 20 are shown in the cover top 18 as the entry point of water into the device. The reinforcing ribs 30 of clip-hooks 24 can be seen transitioning from cover 16 onto clip-hooks 24. Under clip-hooks 24 can be seen the outward protrusions 32 of the water channels. These protrusions 32 act in concert with the clip-hooks 24 and reinforcing ribs 30 to affect a stable connection of the device onto a dishwasher rung. In the figure can also be seen grip areas 34 and stabilizer tongue 26.

Figure 5:
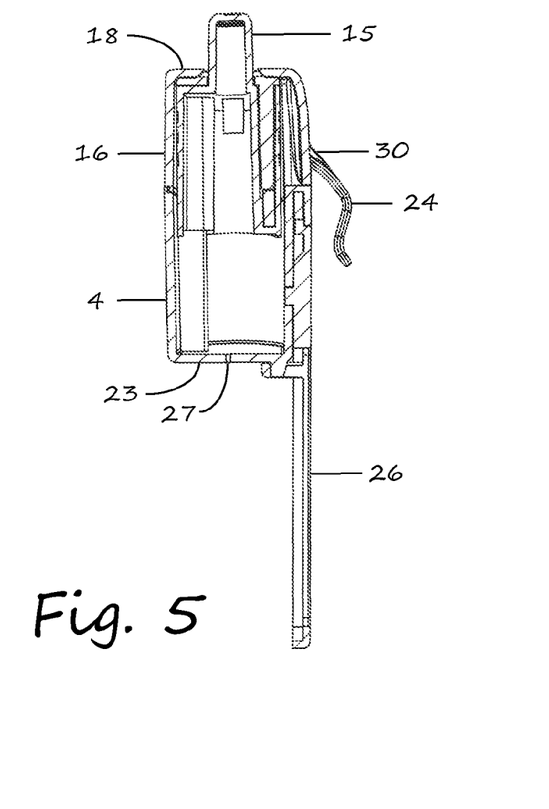
FIG. 5 illustrates a sectional view of a water cycle indicator device showing the internal configuration of the parts.

Turning now to FIG. 5, a sectional view shows the connection points of the parts. Float button 15 is in the highest 'clean' position up against cover top 18. Reinforcing rib 30 is shown transitioning onto hook-clip 24. Cover 16 connects to basin 4. Basin bottom 23 incorporates drain hole 27. Tongue 26 is joined to basin 4.

Figure 6:
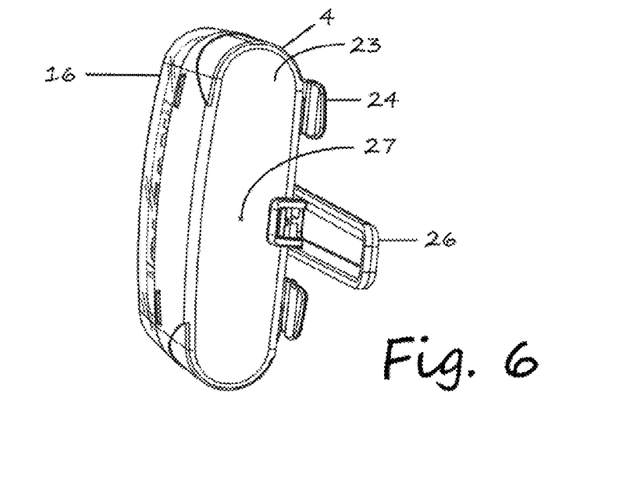
FIG. 6 illustrates a bottom view of a water cycle indicator device showing a discharge opening in the bottom of a basin.

Turning now to FIG. 6, the figure shows a view of the bottom of device 2. Drain hole 27 can be seen in the center of basin bottom 23. Basin 4 is shown joined to cover 16. Also visible in the figure is the bottom of hook-clips 24 and tongue 26.

Figure 7:
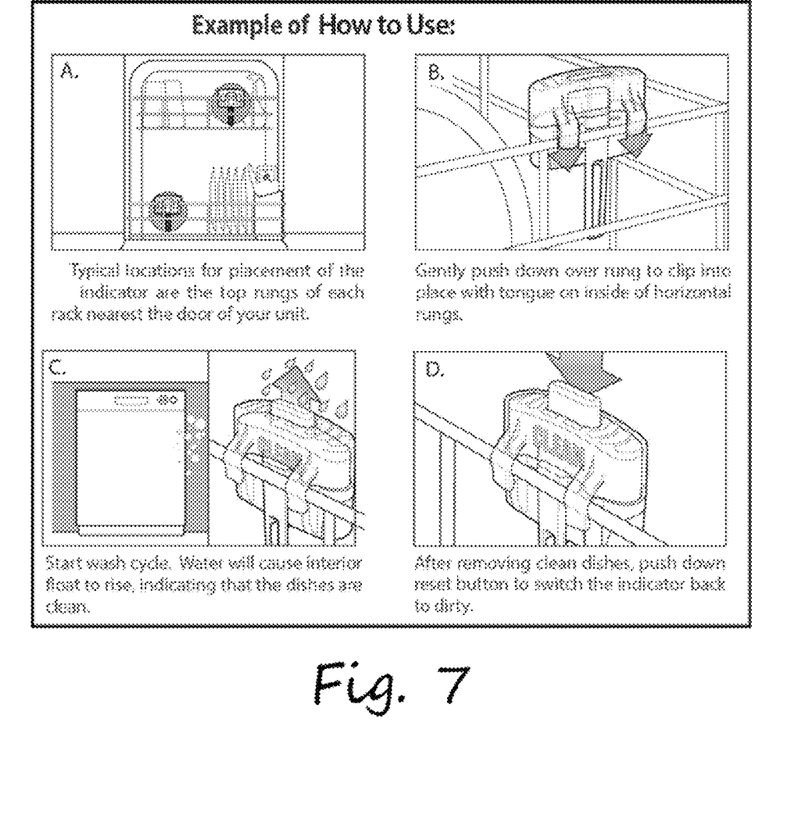
FIG. 7 illustrates "example of how to use" operational views of a water cycle indicator device placed on a dishwasher rack rung.

Turning now to FIG. 7, a chart of "Example of How To Use" instructions are shown in four steps. Window A shows the ideal, typical, locations of the device inside a dishwasher. Window B shows how the device is easily installed on a dishwasher rack rung. Window C shows the float rising to the 'clean' position as water in introduced into the unit during a dishwasher cycle. Window D shows the easy reset function of the device back to the 'dirty' position by the act of the user pressing the reset float button downward until the magnetic field is released.

Figure 8:
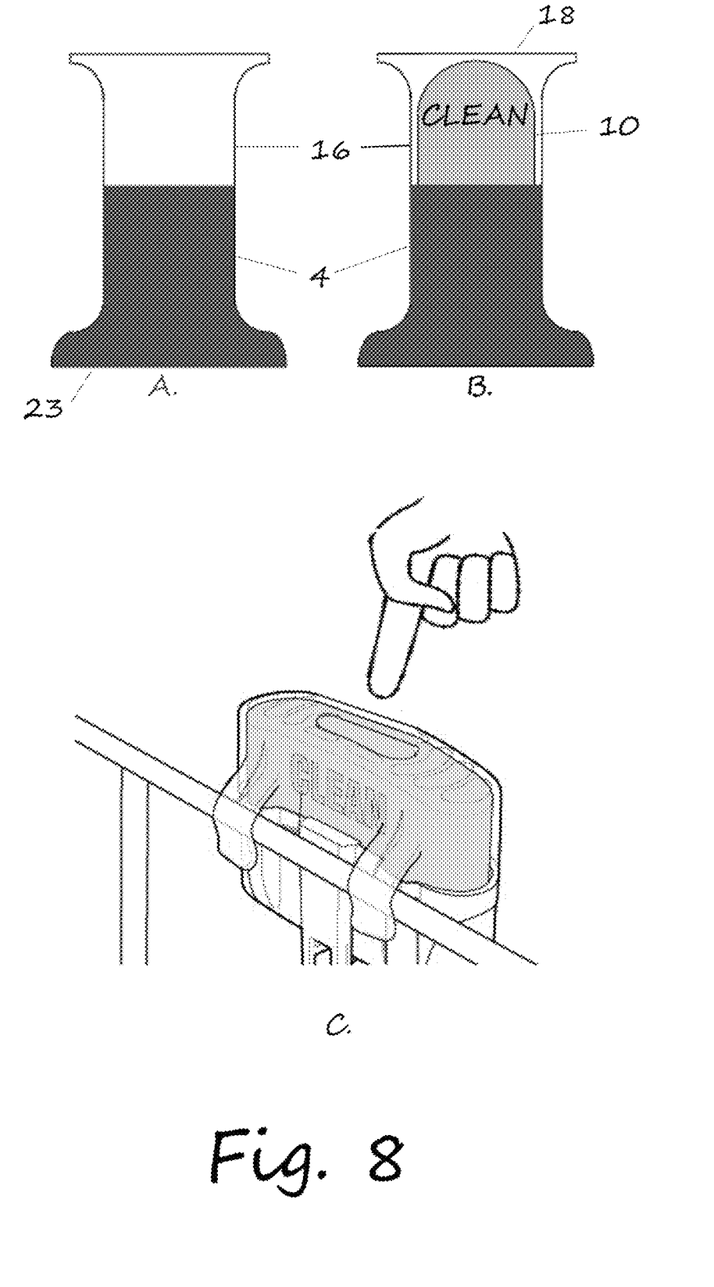
FIG. 8 illustrates a view others aspects of the device wherein the float top has no reset button protruding through the cap top.

Turning now to FIG. 8, the illustration displays two other aspects of device 2 wherein the float does not have a reset button protruding through the cover 16, but has a flat or round topped float which is depressed by the user with their finger through the opening in cover top. 8A and 8B show the 'dirty' and 'clean' positions, respectively, of a round topped float, and 8C shows the 'clean' position of a flat topped float.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise. The terms "device" and "apparatus" are used interchangeably herein.

What is claimed is:

1. A device, comprising:
   a basin defining a basin bottom;
   a float configured to slidingly rise from a low position within in the basin to a predetermined desired risen height inside the basin as the basin fills with water;
   a cover defining a cover top that defines a float guide opening, wherein the cover is configured to cover the basin, wherein the float defines a skirt, a float top; and
   wherein the float is configured to lie substantially below the cover top when the float is in the low position, and wherein the float is configured to rise to a position substantially at the cover top when the float has risen to the predetermined desired risen height.

2. The device of claim 1 wherein the basin and float each comprise a complementary retainer and wherein the retainer of the basin and the retainer of the float are located on a wall of the basin and the skirt of the float, respectively, to retain the float at the desired predetermined risen height above the basin bottom.

3. The device of claim 2 wherein the complementary basin and float retainers do not touch when retaining the float at the predetermined risen height above the basin bottom.

4. The device of claim 1 wherein the cover top defines introduction openings that introduce water into the basin.

5. The device of claim 1 wherein the basin bottom defines one or more discharge openings, wherein the discharge opening has a size that regulates emptying of the basin at a discharge rate slower than an introduction rate of water into the basin.

6. The device of claim 1 wherein the one of the basin and the float define one or more guide rails and the other of the basin and the float define one or more complementary guide channels, wherein the one or more guide rails cooperates with the one or more guide channels to assist in guiding the float as it rises from the low position to the desired risen height.

7. The device of claim 1 wherein the complementary retainer of each of the basin and the float comprises one or more magnets.

8. The device of claim 1 wherein the basin defines a tongue that projects in a direction away from the bottom of the basin and away from the cover top.

9. The device of claim 1 wherein the cover top defines one or more clip-hooks that are set off a predetermined distance from the cover top, and that extend toward basin, that are configured to bias the basin against the rungs of a dishwasher rack.

10. The device of claim 9 wherein the clip-hooks project outwardly downwardly from the cover top and transition from an outward and downward direction with respect to the cover to an inward and downward direction with respect to the cover.

11. The device of claim 1 wherein opposing sides, or opposing areas of the outside of the basin, define recessed areas substantially near the basin bottom.

12. The device of claim 1 wherein the float top defines a float button and wherein the float top is configured to lie substantially below the cover top when the float is in the low position, and wherein the float button is configured to project above the cover top when the float has risen to the predetermined desired risen height.

13. The device of claim 4 wherein the introduction openings regulate the introduction of water into the basin at a predetermined water introduction rate, wherein the predetermined water introduction rate is based on the device being inside a dishwasher, or other water equipment being monitored with the device.

14. The device of claim 1 wherein the cover and float each comprise a complementary retainer and wherein the retainer of the cover and the retainer of the float are located on a wall of the cover and the skirt of the float, respectively, to retain the float at the desired predetermined risen height above the basin bottom.

15. A dishwasher comprising a device, the device comprising:
   a housing defining a basin bottom;
   a float configured to slidingly rise from a low position within a basin of the housing to a predetermined desired risen height inside the housing as the basin of the housing fills with water;
   a cover of the housing defining a cover top that defines a float guide opening, wherein the cover is configured to cover the basin; wherein the float defines a skirt and a float top; and
   wherein the float is configured to lie substantially below the cover top when the float is in the low position, and wherein the float is configured to rise to a position substantially at the cover top when the float has risen to the predetermined desired risen height.

16. The device of claim 15 wherein the housing and float each comprise a complementary retainer and wherein the retainer of the housing and the retainer of the float are located on a wall of the housing and the skirt of the float, respectively, to retain the float at the desired predetermined risen height above the housing basin bottom.

17. The device of claim 15 wherein the cover top of the housing defines introduction openings that introduce water into the basin of the housing.

18. The device of claim 15 wherein the basin bottom of the housing defines one or more discharge openings, wherein the discharge opening has a size that regulates emptying of the basin at a discharge rate slower than an introduction rate of water into the basin.

19. The device of claim 15 wherein the complementary retainer of each of the housing and the float comprise magnets.

20. A dishwasher comprising a device, the device comprising:
   a housing defining a basin bottom;
   a float configured to slidingly rise from a low position within a basin of the housing to a predetermined desired risen height inside the housing as the basin of the housing fills with water;
   a cover of the housing defining a cover top that defines a float guide opening, wherein the cover is configured to cover the basin; wherein the float defines a skirt a float top;
   wherein the float is configured to lie substantially below the cover top when the float is in the low position, and wherein the float is configured to rise to a position substantially at the cover top when the float has risen to the predetermined desired risen height; and wherein the housing and float each comprise a complementary retainer to retain the float at the desired predetermined risen height above the housing basin bottom, and wherein the retainers include electrical components that generate and transmit an electrical signal that indicates the float is at the predetermined desired risen height.

* * * * *